(12) United States Patent
Garcia Becerro et al.

(10) Patent No.: US 9,025,862 B2
(45) Date of Patent: May 5, 2015

(54) RANGE IMAGE PIXEL MATCHING METHOD

(75) Inventors: Frederic Garcia Becerro, Palafrugell (ES); Bruno Mirbach, Konz (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 130 days.

(21) Appl. No.: 13/879,563

(22) PCT Filed: Oct. 7, 2011

(86) PCT No.: PCT/EP2011/067600
§ 371 (c)(1),
(2), (4) Date: Jun. 21, 2013

(87) PCT Pub. No.: WO2012/049098
PCT Pub. Date: Apr. 19, 2012

(65) Prior Publication Data
US 2013/0272600 A1    Oct. 17, 2013

(30) Foreign Application Priority Data
Oct. 15, 2010  (LU) .......................................... 91745

(51) Int. Cl.
G06K 9/00    (2006.01)
G06T 15/00   (2011.01)
G06T 7/00    (2006.01)

(52) U.S. Cl.
CPC ............. G06T 15/00 (2013.01); G06T 7/0024 (2013.01); G06T 2207/10028 (2013.01)

(58) Field of Classification Search
None
See application file for complete search history.

(56) References Cited

U.S. PATENT DOCUMENTS 6,043,838 A * 3/2000 Chen ............................... 348/42
8,396,251 B2 * 3/2013 Mirbach et al. ............... 382/106
(Continued)

FOREIGN PATENT DOCUMENTS

WO    2006058872 A1    6/2006

OTHER PUBLICATIONS

International Search Report for corresponding application No. PCT/EP2011/067600 filed Oct. 7, 2011; Mail date Nov. 29, 2011.
(Continued)

Primary Examiner — Nancy Bitar
(74) Attorney, Agent, or Firm — Cantor Colburn LLP

(57) ABSTRACT

A method for matching the pixels (10-1, 10-2) of a first range image of a scene (18) as seen from a first point of sight (14) with pixels (12-1, 12-2) of a second range image of the scene as seen from a second point of sight (16) comprises the following steps: providing the first range image as a grid of source pixels (10), on which the scene is mapped in accordance with a first projection associated with the first point of sight, wherein each source pixel has a point in the scene projected thereon in accordance with the first projection and has associated therewith a range value determined for that point in the scene; providing a grid of target pixels (12) for the second range image and a second projection associated with the second point of sight; and for each one of the target pixels, a) determining which source pixel would have the same point ($P_1$, $P_2$) in the scene projected thereon in accordance with the first projection as the target pixel would have projected thereon in accordance with the second projection if the imaged scene were a planar surface at a certain surface distance from the first point of sight; b) determining a depth coordinate of the point in the scene that the source pixel determined in step a) actually has projected thereon in accordance with the first projection; c) if the depth coordinate is greater than a threshold, which is itself greater than the surface distance, repeating steps a), b) and c) with an increased surface distance at step a) and an increased threshold at step c), and else associating the target pixel with the source pixel determined in step a).

14 Claims, 8 Drawing Sheets

(56) References Cited

U.S. PATENT DOCUMENTS 8,401,279 B2* 3/2013 Sugino et al. ............. 382/154
2005/0286756 A1* 12/2005 Hong et al. ............. 382/154
2009/0060273 A1* 3/2009 Stephan et al. ............. 382/103

OTHER PUBLICATIONS

R. Crabb et al, "Real-time Foreground Segmentation via Range and Color Imaging", Proceedings of the First International Workshop on Internet Vision (in conjunction with CVPR), Anchorage, Alaska, 2008.

Derek Chan, "A noiseaware filter for real-time depth upsampling, Workshop on Multicamera and Multi-modal Sensor Fusion Algorithms and Applications", ECCV, 2008.

Frederic Garcia, "Pixel Weighted Average Strategy for Depth Sensor Data Fusion", Proceedings of the International Conference of Computer Vision (ICIP 2010).

E. Trucco, "Introductory Techniques for 3-D Computer Vision", Prentice Hall PTR, Upper Saddle River, NJ, USA,1998, chapter 7.

R. Hartley, "Multiple View Geometry in Computer Vision", Cambridge University Press, second edition, 2003.

Written Opinion for corresponding application No. PCT/EP2011/067600 filed Oct. 7, 2011; Mail date Nov. 29, 2011.

* cited by examiner

RANGE IMAGE PIXEL MATCHING METHOD

TECHNICAL FIELD

The present invention generally relates to digital image processing, in particular transforming a range (or distance) image representing a scene as seen from a first point of sight into a range image representing the same scene as seen from a second, offset point of sight. The method according to the invention may e.g. be used for fusing a range image (3D image) and a conventional image (2D image) that have been acquired from different points of view.

BACKGROUND ART

In recent years, 3D cameras based on the Time-of-Flight (ToF) principle have become commercially available. Compared to 2D cameras, they measure, for each pixel, a radial distance of a point in the scene to the camera, while 2D cameras provide only a gray- or colour image of the scene. On the other hand, ToF cameras have much lower resolution than common 2D cameras and the range measurement is affected by noise. Therefore, there are many research and development activities ongoing that target fusing the data of a 2D and a 3D camera in order to profit from the mutual strengths of the different sensor technologies. In the context of the present document data fusion designates fusion of raw data, i.e., a low level procedure as opposed to higher fusion levels in which the fusion deals with post processed data (feature or decision fusion). A possible application is, e.g., image matting (separation of background and foreground). In occurrence, the background and/or the foreground of a 2D image may be identified based on the range information of the 3D image (see, e.g. [1]). Other research activities target enhancing the accuracy and resolution of a 3D camera by fusing the range data with a high resolution 2D image (see e.g. [2] and [3]).

Raw data fusion requires accurate pixel alignment between the recorded data of the individual sensors. This alignment, also called data matching, comprises mapping of the two individual data sets to a common image coordinate grid, which is defined with respect to a unified reference frame. The relationship between the individual sensor reference frames to the unified reference frame (which may coincide with one of the sensor reference systems) determines in this case the mapping of the two data sets onto the common image grid, i.e. the data matching.

A particular problem occurs if the reference frames of the two sensors are not co-centric, i.e. if the two cameras are displaced with respect to each other, which is typically the case. Due to a relative displacement of the two cameras, the location of the projection of a 3D point of the scene onto the individual sensors differs by a shift that is known in the field of stereo vision as binocular disparity. This disparity shift depends on the distance from the imaged point in the scene to the camera. The correspondence of the pixels of the 2D and the 3D camera is not, therefore, a fixed relationship but rather dependent on the objects in the scene. Thus, the mapping of the data on the common grid depends on the distances in the scene and has to be re-calculated whenever the scene changes, which is typically the case for every frame of data acquisition.

In stereo vision, the problem is known as the correspondence problem. Its solution provides a so-called disparity map, which allows the calculation of the distances of object points [6,7]. The detection of corresponding points is typically performed by feature matching or correlation analysis of two stereo images. These methods are numerically demanding and may fail in case of shadow effects, unstructured scenes, or periodic patterns.

The matching of 2D camera data with data from a 3D sensor requires also dealing with the correspondence problem. Besides the fact that stereo vision techniques are numerically demanding, their application is rendered difficult, if not impossible, in case that the resolutions and the types of data of the two sensor data sets are different. This it is the case, however, for a sensor system comprising of a low-resolution 3D sensor and a high resolution 2D camera system.

It has to be noted that in stereo vision the correspondence problem is solved (by feature matching or correlation analysis) in order to determine the distances of the corresponding points in the scene. In the case of data fusion of a 2D and a 3D image of the same scene, the aim is not to extract the distances based on the disparity map. Indeed, as the data captured by the 3D camera contain distance information on the scene, the disparities between the projections on the different sensors can be estimated. The disparity map can finally be used to identify corresponding pixels in the two images.

Technical Problem

It is an object of the present invention to provide a computationally advantageous method for transforming a range image representing a scene as seen from a first point of sight into a range image representing the same scene as seen from a second, offset point of sight. This object is achieved by a method as claimed in claim 1.

General Description of The Invention

According to the invention it is proposed a, preferably computer-, software- or hardware-implemented, method for matching the pixels of a first range image of a scene as seen from a first point of sight with pixels of a second range image of the scene as seen from a second point of sight. The method comprises the following steps:

providing the first range image as a grid of pixels, hereinafter denoted "source pixels", on which the scene is mapped in accordance with a first projection associated with the first point of sight, wherein each source pixel has a point in the scene projected thereon in accordance with the first projection and has associated therewith a range value determined for that point in the scene;

providing a grid of pixels, hereinafter denoted "target pixels", for the second range image and a second projection associated with the second point of sight (the second projection describing the perspective from the second point of sight); and for each one of the target pixels,
  a) determining which source pixel would have the same point in the scene projected thereon in accordance with the first projection as the target pixel would have projected thereon in accordance with the second projection if the imaged scene were a planar surface at a certain distance (hereinafter termed "surface distance") from the first point of sight;
  b) determining a depth coordinate of the point in the scene that the source pixel determined for the source pixel in step a) actually has projected thereon in accordance with the first projection, based on the range value of that source pixel;
  c) if the depth coordinate is greater than a threshold, which is itself greater than the surface distance, repeating steps a), b) and c) with an increased surface distance at step a) and an increased threshold at step c), and else associating the target pixel with the source pixel determined in step a).

As used herein, the term "pixel" designates a picture element. Each pixel is defined by its position and its value. The corresponding image may be visualized by graphically representing the values of the pixels at the respective pixel locations. An "image", as used herein, designates a set of pixels with their associated pixel values. An image may e.g. be stored as an array or matrix of pixel values, provided the relationship between the position of the pixel value in the array or matrix and the position of the pixel is known. Such relationship is typically fixed by a standard (referred to as image file format).

In the context of the present invention, the positions of the images and their pixels, relative to the points of sight, as well as the positions of the points of sight relative to one another, the focal lengths, etc. are assumed known and constant in time. The geometry of the scene, however, may change from one frame to the next.

As those skilled will appreciate, a possible application of the present method is the matching of the pixels of a 2D image and a 3D image of the same scene. The above-mentioned grid of target pixels may be selected so as to correspond to the grid of pixels of the 2D image. Alternatively, the pixels of the 2D image and the 3D image could be matched with a common pixel grid having the same point of sight as the 2D image (but possibly another orientation).

The first range image (or 3D image) preferably stems from a range imager, e.g. a range camera or scanning imager operating according to the time-of-flight principle. The first image may be the original range image (as acquired) or obtained from the original image after distortion correction and/or image rectification.

The method of the invention takes into account that the correspondence between the source pixels and the target pixels depends on the content of the imaged scene. Indeed, in step a), one determines which source pixels corresponds to a given target pixel under the assumption that the imaged scene is a planar surface at a certain distance from the first point of sight. For the found source pixel, this assumption is validated or invalidated in step c).

The action in step c) of associating the target pixel with the source pixel determined in step a) establishes the correspondence of these two pixels, i.e. these pixels "look at" or represent the same point in the scene. This association or correspondence could e.g. be stored in a correspondence table, for subsequent or later use. But it is also possible to use the correspondence immediately, without storing it as such. Associating the target pixel with the source pixel determined in step a) could e.g. comprise or consist of determining and associating with the target pixel the distance from the second point of sight to the point in the scene which the source pixel determined in step a) actually has projected thereon in accordance with the first projection. Alternatively or additionally, associating the target pixel with the source pixel determined in step a) may comprise or consist of associating the depth coordinate determined in step b) with the target pixel.

Preferably, iteration of steps a), b) and c) is carried out for all target pixels with a predefined series of surface distances and a predefined series of thresholds. The iteration stops as soon as the current depth coordinate (calculated at step b)) does not exceed the corresponding threshold (which lies in the interval between the current and the next surface distance value in the series). When this happens, one has found the source pixel that corresponds to the target pixel considered, taking into account the distance-dependent disparity. Preferably, the series of surface distances corresponds to (translates into) an arithmetic sequence of binocular disparity values, the common difference of which (i.e. the constant difference between any two successive members of the sequence) is equal or substantially equal to the mesh size (pixel size) of the grid of target pixels. This choice is advantageous if the target pixel grid has uniform mesh size, because smaller disparity differences cannot be resolved and greater ones could cause a wrong (less than optimal) source pixel to be associated with a given target pixel.

Most preferably step a) is carried out using a lookup table associated with the surface distance. As the hypothetical surface distances are known beforehand (need not be computed at runtime), it is possible to store the correspondence between target pixels and source pixels for each surface distance in a particular lookup table. Thus, for each of the series of surface distances, one has a dedicated lookup table. The lookup tables take into account the disparity associated with each surface distance. Preferably, the depth coordinates associated with the source pixels are calculated beforehand, i.e. before iteration through steps a)-c) starts and stored in a matrix (yielding a "depth coordinate image"). Determining the depth coordinate that the source pixel determined for the source pixel in step a) actually has projected thereon in accordance with the first projection may thus be achieved by simply looking up the previously stored depth coordinate associated with that source pixel in a dereferencing step.

According to a preferred embodiment of the invention, the second range image is selected with a higher resolution than the first range image. This is especially advantageous in an application where the ultimate goal is to match a low-resolution 3D image with a high-resolution 2D image of the same scene.

Advantageously, the grid of pixels of the first range image and the grid of target pixels are located in a common image plane. The grid of pixels of the first range image and the grid of target pixels are preferably regular rectangular grids. Although such geometrical configuration is preferred for its simplicity, other configurations are possible. Since for a given surface distance, another geometric configuration translates only into a different correspondence between the source pixels and the target pixels, which is calculated once and stored in a lookup table, the choice of the geometric configuration has no or only a slight influence on the computation time at runtime.

Nevertheless, one may gain a notable advantage with a geometric configuration, wherein the grid of pixels of the first range image has two grid axes, the grid of target pixels also has two grid axes, and one of the grid axes of the grid of pixels of the first range image and one of the grid axes of the grid of target pixels are parallel to a line passing through the first and second points of sight. Indeed, in this case, the lookup tables for the different surface distances may become partially identical. This makes it possible to reduce the storage space by using a single, condensed lookup table associated with the series of surface distances and using a different look-up scheme for each surface distance.

A preferred embodiment of the method comprises providing a two-dimensional image of the scene as seen from the second point of sight (e.g. by acquiring such image with a 2D camera) and mapping the two-dimensional image on the grid of target pixels via a distortion correction and/or a projective transformation. This corresponds to the case where a 2D image and a 3D image are mapped on a pixel grid that is not identical to the pixel grid of the 2D image. In case the range image is to be mapped directly on the pixel grid of the 2D image, any distortion correction or necessary projective transformation is taken into account in step a).

An aspect of the present invention concerns a computer program comprising instructions that cause a processor to carry out the method as described hereinabove, when the program is executed on the processor. Such computer program may be provided as part of a computer program product, including a carrier, e.g. a data storage device (such as a hard disk, an optical storage disk, a memory stick or card, or the like) or a carrier signal (e.g. a digital or analog communication signal), carrying the computer program.

BRIEF DESCRIPTION OF THE DRAWINGS

Further details and advantages of the present invention will be apparent from the following detailed description of a not limiting embodiment with reference to the attached drawings, wherein.

DETAILED DESCRIPTION OF A PREFERRED EMBODIMENT

Introduction—Stereo Vision

Matching the data of two 2D cameras onto each other is the main subject in the field of stereo vision. As this field is well established and developed with existing industrialized products, the state of the art is only briefly summarized with emphasis on the differences to the invention. For more details on stereo vision, the interested reader is referred to textbooks like [5,6].

In the following we consider two sets of data $I_A(i,j)$ and $I_B(k,l)$ from the same scene, recorded in the camera reference frames A and B, respectively. The data are stored in the form of matrices where the indices i=1, . . . M, j=1, . . . , N, respectively k=1, . . . , K, l=1, . . . , L, refer to the pixels of the corresponding camera. The data types of $I_A$ and $I_B$ maybe digitalized gray or color values.

Solving the correspondence problem, that is finding pairs $\{(m,n),(k,l)\}$ of pixels from both images that correspond to the same point in the scene is the main topic in stereo vision. The solution can be typically divided in two steps.

Figure 1:
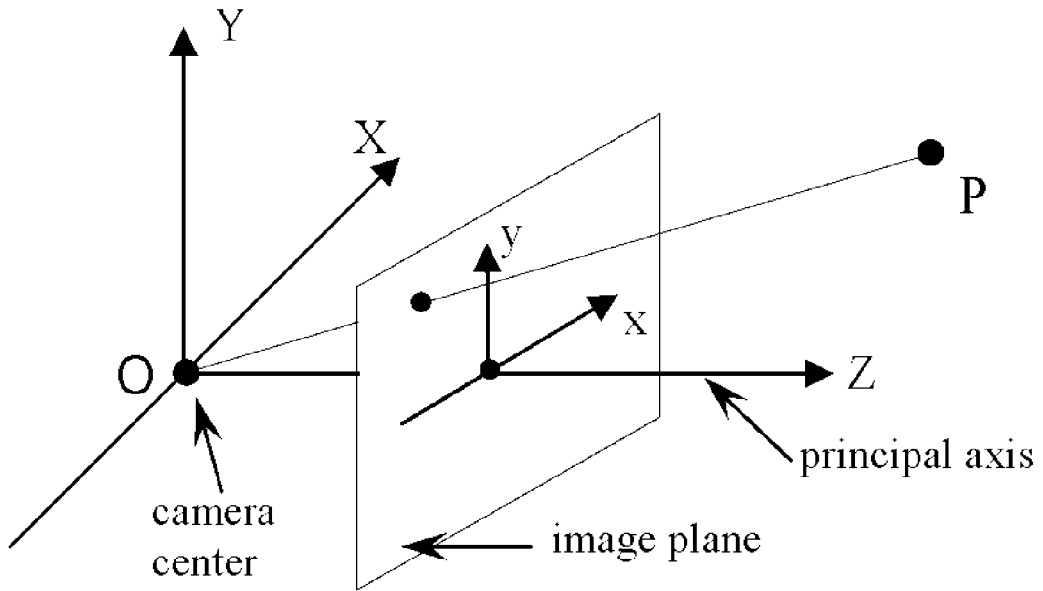
FIG. 1 is an illustration of the pinhole camera model: The image plane is positioned at the distance of the focal length in front of the projection center O, perpendicular to the optical (or principle) axis of the system. The image coordinates (x,y) are obtained by intersecting the line between O and P with the image plane. In a real optical system, the calculation of images coordinates from the pixel index or indices requires the knowledge of the internal camera parameters, i.e. focal length, position of optical axis, and distortion coefficients.
Figure 2:
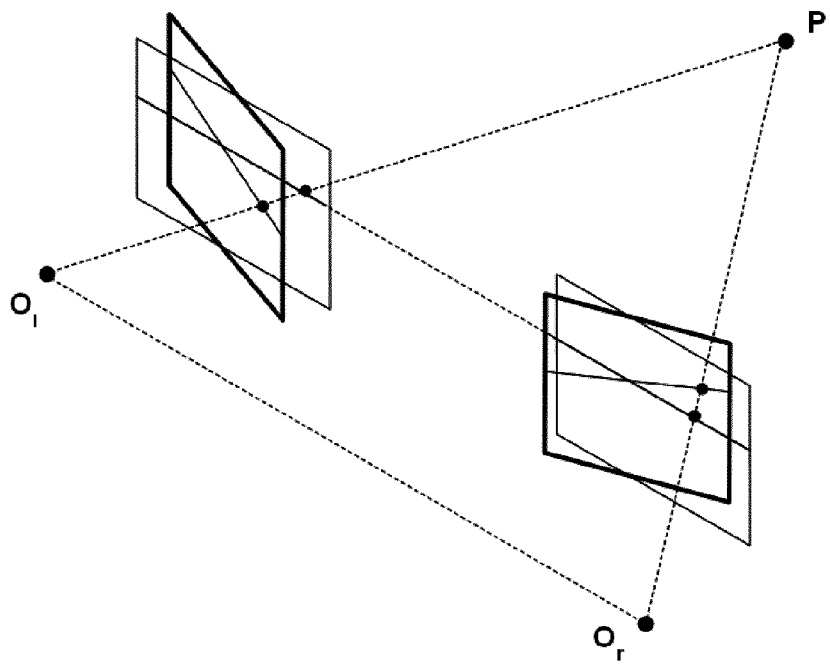
FIG. 2 is an illustration of the image planes of a stereo camera system. Projective transformations allow making them co-planar, so that the x-axis of both images is parallel to the line through the projection centers $O_l$ and $O_r$ (image rectification).
Figure 3:
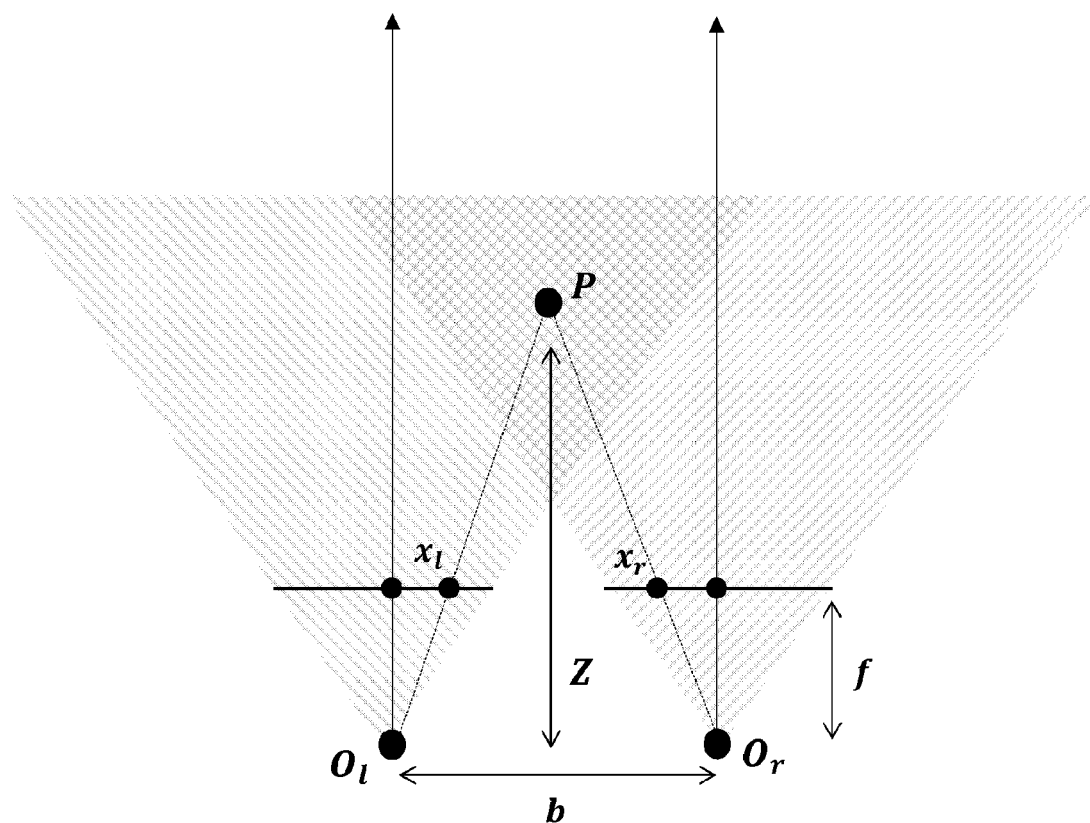
FIG. 3 illustrates the disparity shift of a stereo camera with baseline b. The optical axis of the two cameras are parallel. The positions $x_l$, $x_r$ of the projections of a point P in the scene onto the two image planes differ by a disparity $\rho=x_l-x_r$, which depends on the distance Z of the point P to the baseline.

1. The pixel coordinates are transformed into a unified image reference system. This transformation comprises two steps
   i. First, the pixel coordinates of each camera are transformed to the image plane thereof. This image plane can be seen as a plane, perpendicular to the optical axis of the camera, in a distance Z=f (f being the focal length) from the projection center, i.e. the image plane is parallel to the x-y plane of the camera reference frame. The transformation from pixel to image coordinates corrects the distortion of the lens and handles a displacement of the optical axis. At this level, the image coordinates correspond to the perspective projection of the corresponding 3D points in the scene on the image plane with the projection center being the center of the camera reference system (see FIG. 1). In contrast to the undistorted image coordinates, the original pixel coordinates on the imager are often denoted as distorted image coordinates.
   ii. A second, so-called projective transformation, transforms the two image planes in such a way that they become co-planar and that one of the plane axis (typically the x-axis) is parallel to the line through the projection centers (see FIG. 2). This transformation to a unified reference frame requires the knowledge of the relative position and orientation of the cameras, but may also be determined directly in a calibration procedure.
   The coordinate transformations of steps i. and ii. define a so-called image rectification. This is a transformation of the images, which can be carried out in real time using two lookup tables. After the full image rectification, pairs of so-called conjugate epipolar lines become collinear parallel to the x-axis of the common image plane. In this way, the search for corresponding pixel is reduced to a one-dimensional search on a scanline, which can be performed in real time.
2. Once a pair of corresponding pixels $\{(m,n), (k,n)\}$ at positions $x_l(m,n)$ and $x_r(k,n)$ is determined, the distance of the corresponding 3D point in the scene is easily calculated according to the formula (compare FIG. 3)

$$Z = f\frac{|x_l - x_r|}{b} \quad (1)$$

where the difference $\rho = x_l - x_r$ is called "binocular disparity".

As an alternative to step ii., a so-called essential matrix can be established that describes the relation between conjugate epipolar lines. One can go a step further and include the displacement of the optical axis and the image scaling due to the focal length into the transformation that relates the epipolar lines; in this case, one speaks about a fundamental matrix (for details see [5,6]).

Irrespective of which transformation is chosen in step 1., the correspondence search for corresponding points (step 2.) is either based on correlation analysis or on feature matching. Both methods require that the two images contain the same type of the data. The correspondence between two different sensors, e.g., a 2D camera providing a matrix $I_A$ of gray or colour values and a 3D camera providing a matrix $R_B$ of distance values, cannot be established using this stereo vision method. In addition, the method has problems to find corresponding pixels in case of shadow effects, unstructured scenes, or by periodic patterns in the images.

Matching of a 2D and a 3D Image of a Scene

The invention will now be illustrated on the example of matching the pixels of a 3D imager and a 2D camera onto a common image grid in a unified reference frame.

Matching the data $I_A$, related to the 2D camera reference frame A, and $R_B$, related to the 3D camera reference frame B, requires establishing the transformations of pixel coordinates of both sensors to a unified reference frame, while taking into account the distance-dependent disparity shift. These transformations are described in more detail below. The data matching itself corresponds to a mapping of the data from both sensors to a common coordinate grid in the unified reference frame. By assigning to each grid point a pair of values from the data set $I_A$ and $R_B$ respectively, the data of the two sensors are aligned pixel by pixel.

Establishing a Transformation to a Common Reference Frame, Using Range Information for Disparity Calculation Step A1/B1: Distortion Correction The first step to transform the coordinates of the 2D camera and the 3D camera to a unified reference frame is to transform the pixel coordinates of both sensors to their own camera reference frame, as described in step 1.i. for stereo vision systems. As a result one obtains two sets of coordinates $\{(u^A(m,n), v^A(m,n)), m=1, \ldots, M; n=1, \ldots, N\}$ and $\{(x^B(k,l), y^B(k,l)), k=1, \ldots, K; l=1, \ldots, L\}$ for the 2D, respectively 3D camera. We will refer to these transformations as Step A1 respectively B1. At this level, the distortion of the lenses has been corrected and a displacement of the optical axis has been corrected, that is the real camera systems have been mapped to pinhole cameras with pixel coordinates at the new image coordinates.

It should be noted that this transformation is determined by the so-called internal camera parameters which are fixed (i.e. independent on the scene content).

The undistorted image coordinates $\{(x^B(k,l), y^B(k,l)), k=1, \ldots, K; l=1, \ldots, L\}$ of the 3D camera allow a calculation of the 3D coordinates $\{(X^B(k,l), Y^B(k,l), Z^B(k,l)), k=1, \ldots, K; l=1, \ldots, L\}$ of the scene from the range measurements $\{R^B(k,l), k=1, \ldots, K; l=1, \ldots, L\}$. $R^B(k,l)$ is the range value associated with pixel $(k,l)$ having "undistorted" coordinates $(x^B(k,l), y^B(k,l))$ by simply multiplying the range values with scale factors $\{(e_x^B(k,l), e_y^B(k,l), e_z^B(k,l)), k=1, \ldots, K; l=1, \ldots, L\}$ which are determined by the undistorted image coordinates.

For $k=1, \ldots, K; l=1, \ldots, L$, one has:

$$X_B(k, l) = e_x^B(k, l)R_B(k, l) \quad (2)$$
$$Y_B(k, l) = e_y^B(k, l)R_B(k, l)$$
$$Z_B(k, l) = e_z^B(k, l)R_B(k, l)$$

with $$e_x^B(k, l) = \frac{x^B(k, l)}{d^B(k, l)}$$

$$e_y^B(k, l) = \frac{y^B(k, l)}{d^B(k, l)}$$

$$e_z^B(k, l) = \frac{f^B(k, l)}{d^B(k, l)}$$

and $$d^B(k, l) = \sqrt{(x^B(k, l))^2 + (y^B(k, l))^2 + (f_B)^2}.$$

As the undistorted image coordinates are independent of the measured distance values and thus of the scene content, they can be pre-computed and allow therefore a fast transformation of a range image to 3D-coordinate images (see also [4]).

Step B2: Disparity Correction

In a possible implementation of the invention, the next step in the coordinate transformation is to correct the binocular disparity shift disparity $\rho$ of the 3D camera by using the range measurements of the 3D camera. Let b be the known translation of the 2D camera to the 3D camera, and $Z_B(k,l)$ the Z-coordinate of a pixel $(k,l)$, calculated from the corresponding range measurement $R_B(k,l)$ according to formula (2). The corresponding binocular disparity $\rho$ of this pixel can be calculated according to (compare formula (1)):

$$\rho(k, l) = b\frac{f_B}{Z_B(k, l)} \quad (3)$$

We describe here only the case of a translation of the two camera systems along the x-axis of the 3D camera. The generalization of the approach to an arbitrary shift in all 3 dimensions is, however, straight forward. By correcting the image coordinates of the 3D camera by the disparity shift yields new 3D image coordinates $$x'^B(k,l) = x^B(k,l) - \rho(k,l)$$

$$y'^B(k,l) = y^B(k,l)$$

referring to a reference frame which is the same as the 3D camera reference frame B, but shifted to the center of the 2D camera reference frame A. We refer to this disparity shift as Step B2 in the coordinate transformation. It is important to note that this transformation depends on the content of the scene and may therefore vary from frame to frame which the camera captures. The radial distances $\{R_B(k,l)\}$ are not invariant under the disparity shift, but have to be recalculated using the transformed pixel coordinates, which may however, be efficiently accomplished by using some pre-computed factors as described in [4] for the calculation of coordinates from radial distances according to formula (2). We denote the transformed radial distances in the following as $\{R'_B(k,l)\}$. In practice, if the distances are large compared to the disparity shift, this transformation of radial distances may, however, be negligible.

Step A2/B3: Transformation to a Unified Reference System

The next steps (A2, respectively B3) comprise transforming these coordinates to a unified reference frame C by a so-called projective transformation. Such projective transformation is always possible, if the projection centers coincide [6]. The projective transformation accounts for the orientations of the cameras with respect to the unified reference system. We refer to $T_{AC}$ and $T_{BC}$ as the transformations from the 2D camera reference frame A, respectively the 3D camera reference frame B, to the unified reference frame C. The results of the transformations are then two sets of pixel coordinates $\{u^C(m,n), v^C(m,n), m=1, \ldots M; n=1, \ldots, N\}$ and $\{x^C(k,l), y^C(k,l), k=1, \ldots, K; l=1, \ldots, L\}$ with respect to the common, unified reference frame C.

This transformation is analogous to step 1.ii. for stereo vision with two differences

- The disparity correction has been performed before this transformation using the range information. This guarantees that the projective transformation is independent of the distance. The transformation can be easily determined by a calibration process based on four reference points (see [6]).
- Any frame can be chosen as the unified reference frame, provided it has the same projection center as A. There is no further limitation determined by the relative orientation of the two camera systems. One option could be to choose C identical with A, (in which case $T_{AC}$ is the identity transformation). Such choice would reduce the calibration effort.

Figure 4:
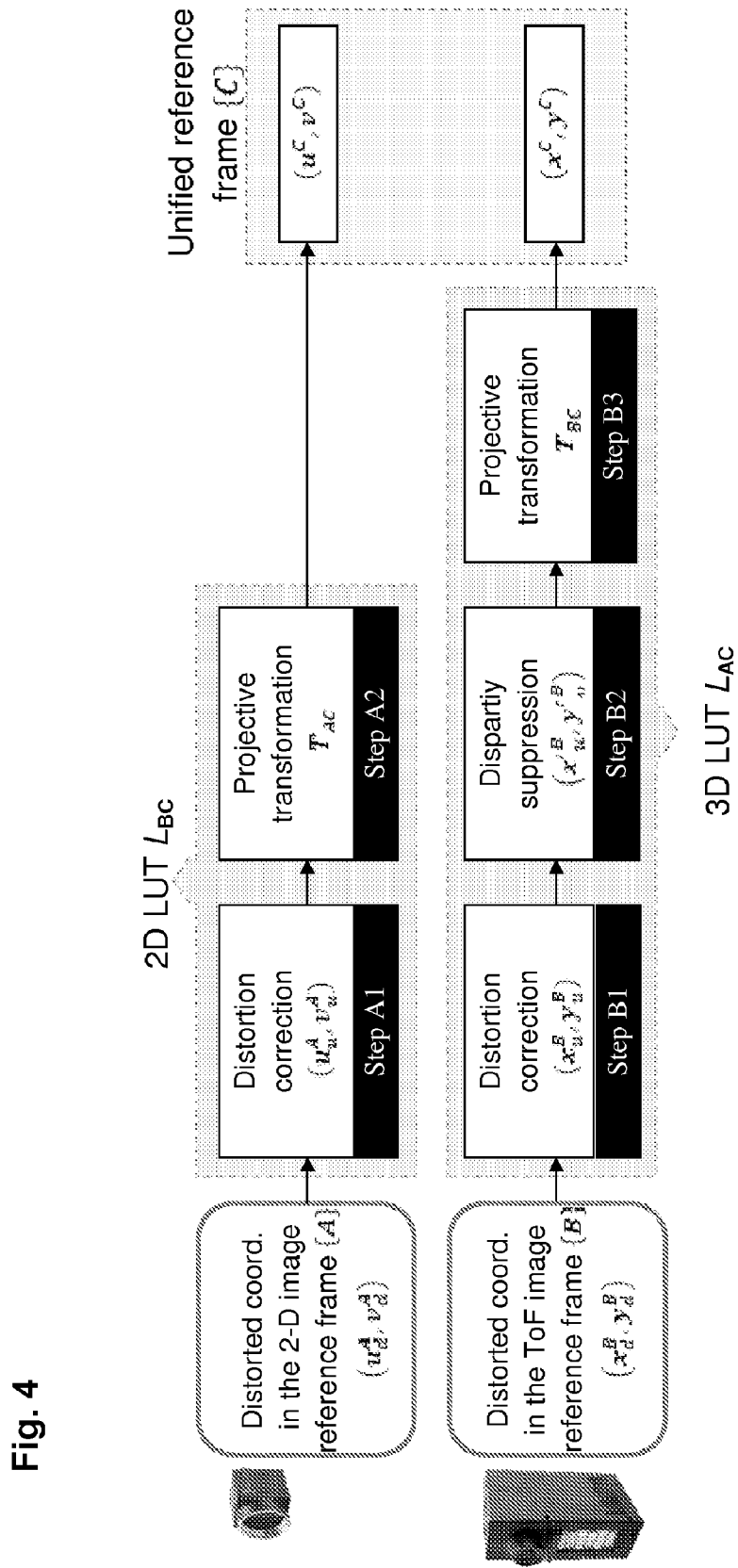
FIG. 4 is a flowchart showing a possible sequence of transformations of the pixel coordinates of a 3D imager and a 2D camera to a common reference frame.
Figure 5:
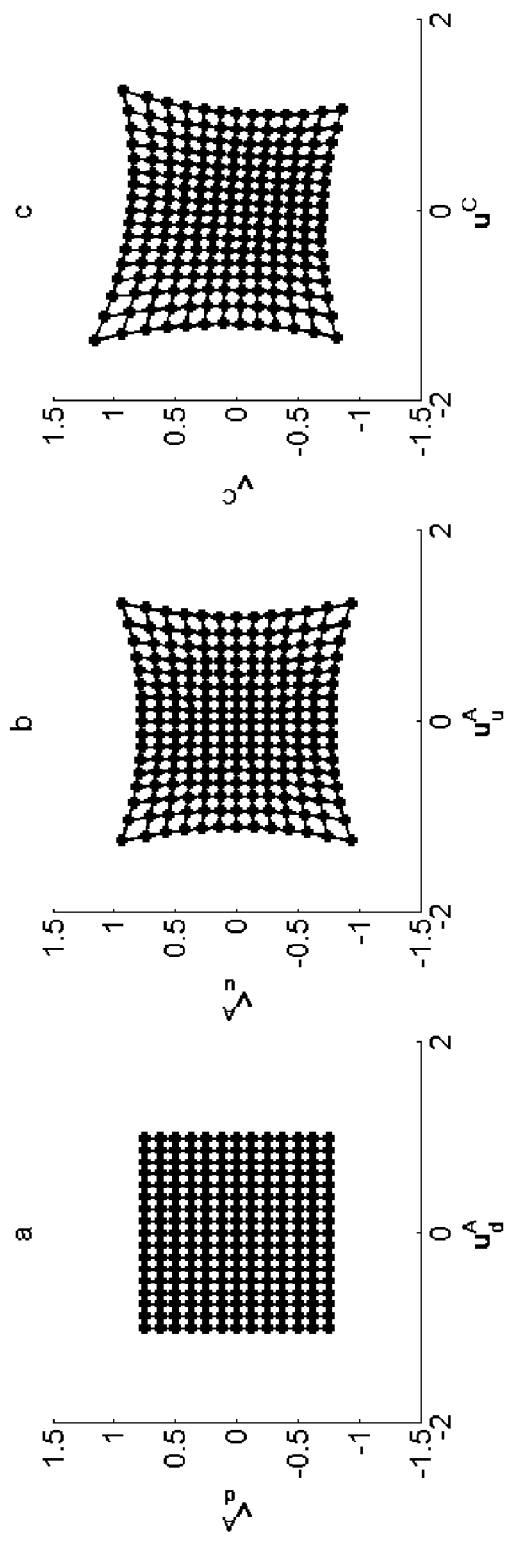
FIG. 5 is an illustration of the transformation of a rectangular grid of pixel coordinates under the transformations mentioned in steps A1 and A2 of FIG. 4: (a) the original rectangular grid corresponding to the pixel coordinates on the imager; (b) the image coordinates in the imager's reference system obtained by distortion correction from (a); (c) coordinates after step A2, the projective transformation that accounts for the orientation of the camera system with respect to the reference system.
Figure 6:
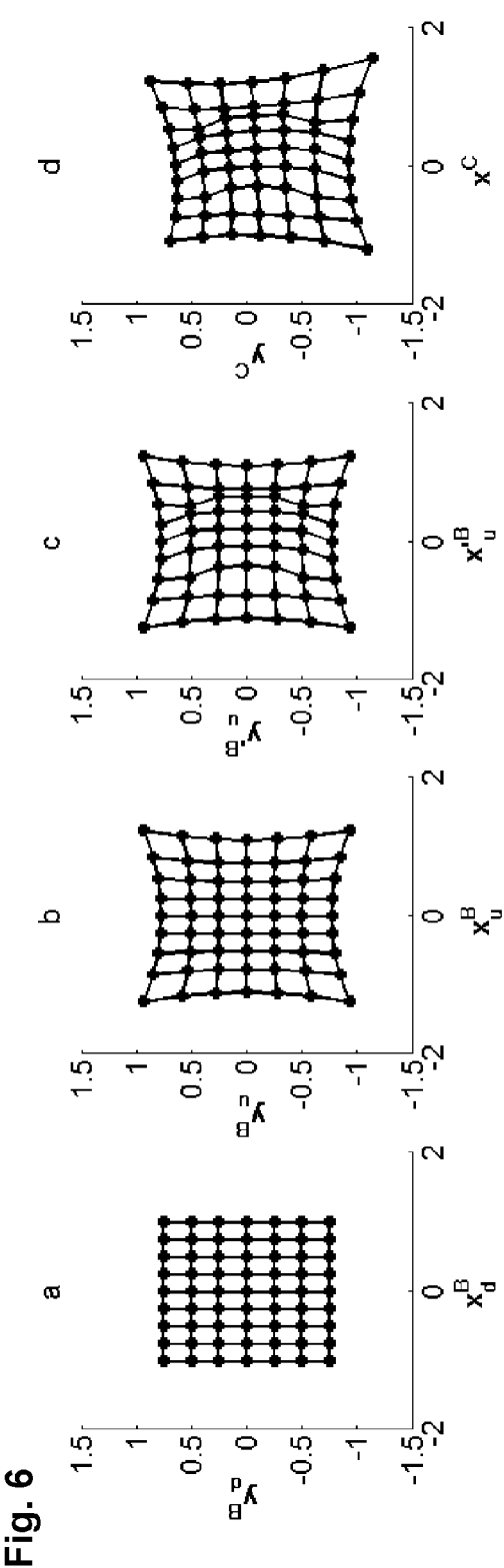
FIG. 6 is an illustration of the transformation of a rectangular grid of pixel coordinates under the transformations mentioned in steps B1 to B3: (a) the original rectangular grid corresponding to the pixel coordinates on the imager; (b) the image coordinates in the imager's reference system obtained by distortion correction from (a); (b) the coordinates after disparity correction, which is dependent on the distances in the scene; (d) coordinates after step B2, the projective transformation that accounts for the orientation of the camera system with respect to the reference system.

FIG. 4 shows the different coordinate transformations in a flow chart. In FIGS. 5 and 6, the transformation of a grid of pixel coordinates for the 2D, respectively 3D sensor under the corresponding transformations is illustrated. It is worthwhile noting that the radial distance $R'_B$ measured between a point in the scene and the projection center of the 2D camera is invariant under a projective transformation. Therefore, they need not be transformed when the projective transformation is performed.

Data Matching

The final step in matching the two sets of data $I_A$ and $R'_B$ of the 2D, respectively 3D camera, is to align them pixel by pixel in the unified image reference frame C.

Let us define in the unified reference frame C a mesh grid $\{\xi^C(i,j), \psi^C=(i,j), i=1, \ldots, \Xi; j=1, \ldots, \psi\}$ of virtual pixel coordinates, on which $I_A$ and $R'_B$ will be mapped, resulting in rectified images $I_C$ and $R_C$, respectively. Preferably, one chooses the size and resolution of this mesh grid similar to that of the 2D camera, which has typically a much higher resolution than the 3D imager. The rectification is based on the nearest neighbour principle: for each of the pixels (i,j) of the mesh grid, one determined the pixel (m,n) of $I_A$ whose coordinates $(u^C(m,n), v^C(m,n))$ are closest to the mesh grid point coordinates $(\xi^C(i,j), \psi^C(i,j))$. The mapping $$(i,j) \to (m,n) =: L_{AC}(i,j)$$

is then stored as a lookup table (LUT) $L_{AC}$, which allows to generate the rectified image $I_C$ from the original image $I_A$ using:

$$I_C(i,j) := I_A(L_{AC}(i,j))$$

for all (i,j).

In the same manner, second LUT $L_{BC}$ can be constructed that rectifies the image $R'_B$ to become an image $R_C$ on the same mesh grid:

$$R_C(i,j) := R'_B(L_{BC}(i,j))$$

Figure 7:
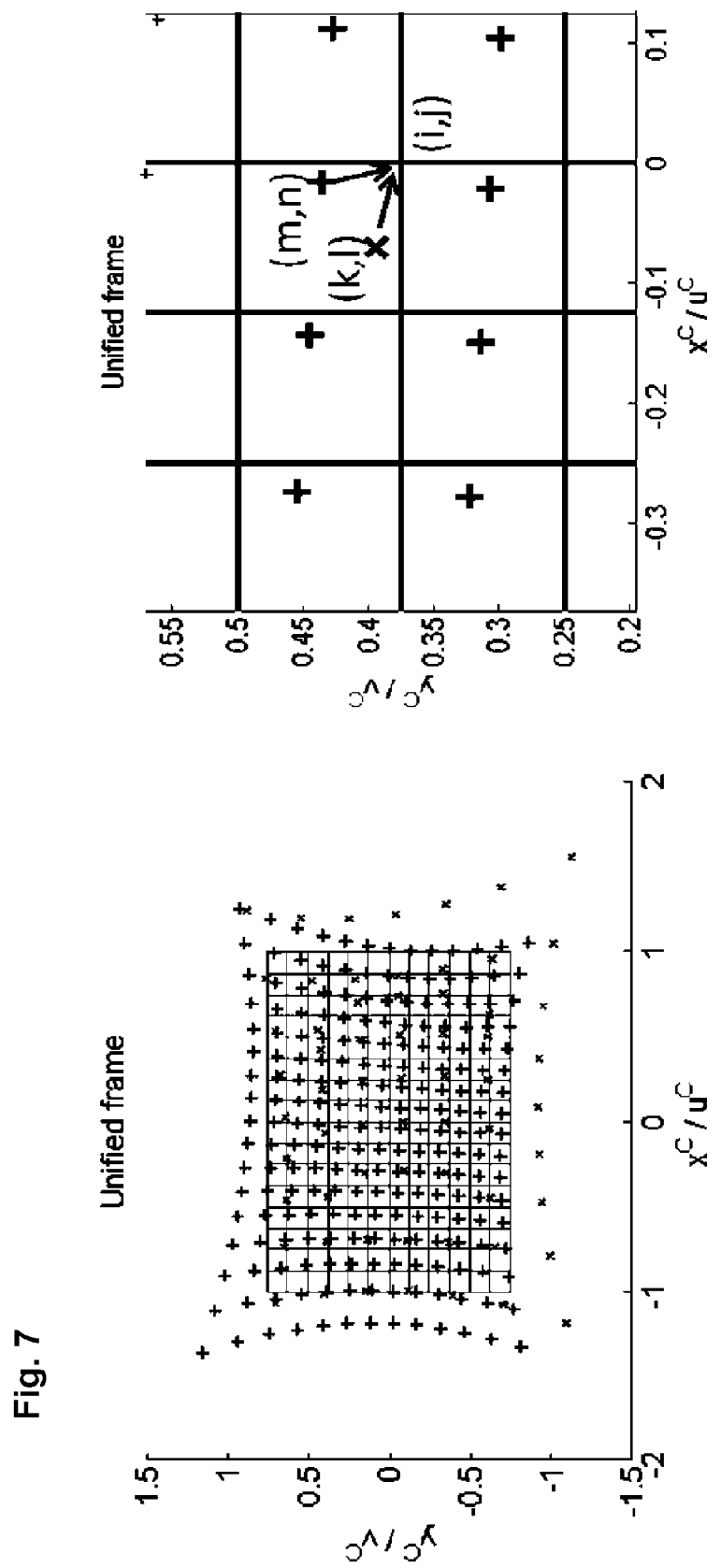
FIG. 7 is an illustration of how lookup tables may be built to establish the correspondence of pixels of two images.
Figure 8:
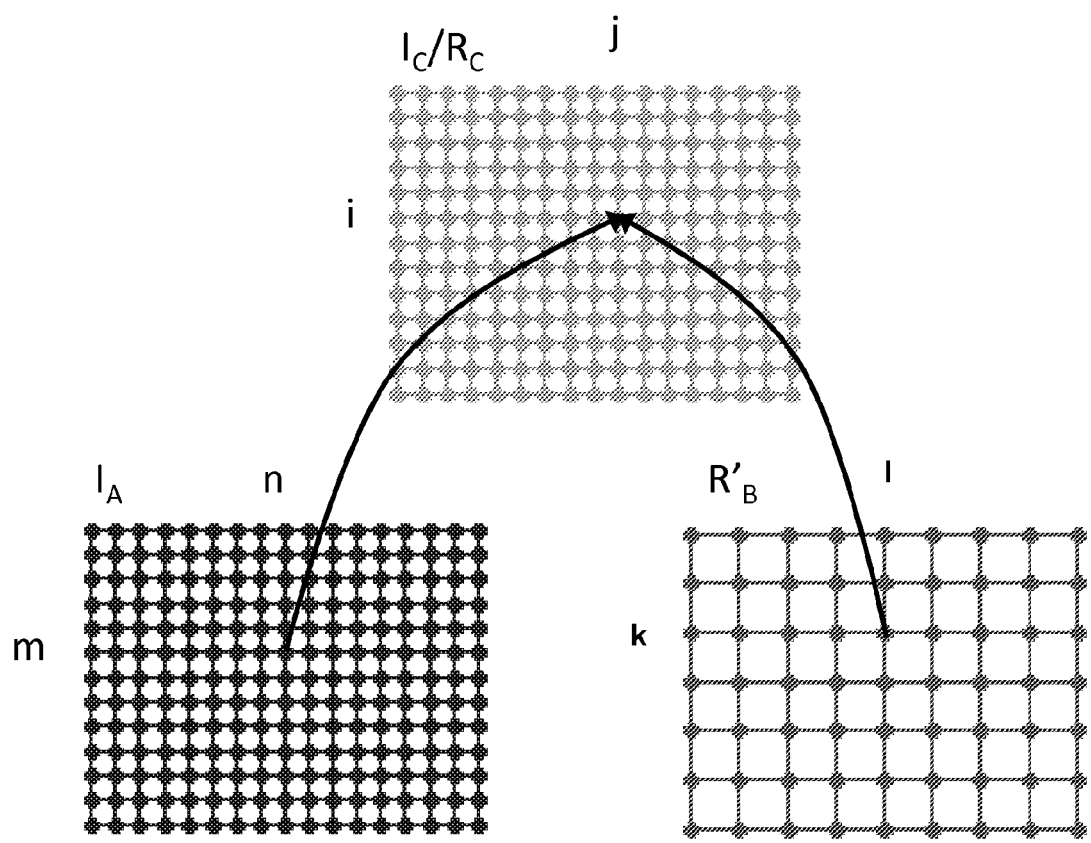
FIG. 8 is a schematic of the mapping of a 3D image and a 2D image on a common target grid.

$R_C$ is thus pixel-aligned to $I_C$. In analogy to the construction of $L_{AC}$, $L_{BC}$ is built by searching for each pixel (i,j) of the mesh grid the pixel (k,l) of $R'_B$ whose coordinates $(x^C(k,l), y^C(k,l))$ are closest to the mesh grid coordinates $(\xi^C(i,j), \psi^C(i,j))$. Note that this image rectification comprises an up-sampling of the 3D image $R'_B$ to the desired resolution defined by the mesh grid. The determination of the lookup tables is visualized in FIG. 7. Shown are the image coordinates $(x^C, y^C)$ (as x) and $(u^C, v^C)$ (as +) of the 2D camera and the 3D imager, respectively, in the common reference frame, together with a mesh grid of synthetic pixel coordinates $(\xi^C, \psi^C)$ (target grid). The left picture shows a full reference frame with the entire mesh grid and all pixel coordinates. The right picture shows an enlarged view of a detail of the left picture. For each mesh grid point (i,j), a pair of pixels (pixel (k,l) from the 3D imager and pixel (m,n) from the 2D camera) having their coordinates closest to the mesh grid point coordinates is determined. The indices (k,l) and (m,n) are stored in the lookup tables $L_{BC}$ and $L_{AC}$, respectively, at position (i,j). It is apparent that a pixel from the low-resolution imager will be mapped on several pixel of the high-resolution target grid. FIG. 8 is a sketch of the data mapping itself. A pixel of the 2D image as well as a pixel of the range image is mapped on a target pixel (i,j) of a target mesh grid. The corresponding indices are stored in two look-up-tables:

$$(m,n) =: L_{AC}(i,j) (k,l) =: L_{BC}(i,j)$$

If desired, the 3D coordinates $\{X_C(i,j), Y_C(i,j), Z_C(i,j), i=1, \ldots, \Xi; j=1, \ldots, \psi\}$ with respect to the unified reference frame can be calculated using formula (2) based on the mapped range image $R_C$ and the pixel coordinates of the common mesh grid. These 3D coordinates may be obtained in the same manner as in formula (2) using some pre-computed unit vectors (see [4]).

Implementation of the Matching

The image rectification using lookup tables can be performed in real time in an embedded machine vision system. The computation of the lookup table itself, is however computationally very demanding, as for each target pixel in the mesh grid a search through all pixels of the source images $I_A$ and $R_B$ has to be performed. While $L_{AC}$ can be calculated a priori from the internal and external camera parameters, $L_{BC}$ depends on the scene and thus on the range image itself, such that it needs to be recalculated at runtime, in principle, for each frame.

A solution to deal with real-time performance in dynamic scenes can be given by considering a set $\{L_{BC,\omega}; \omega=0, \ldots, \Omega-1\}$ of LUTs, where each LUT $L_{BC,\omega}$ tackles a different disparity $\rho_\omega$ corresponding to a planar surface at a fixed distance $$Z_\omega = b\frac{f}{\rho_\omega}, \omega = 0, \ldots, \Omega-1$$

We choose the discrete disparities $\rho_k$ as multiplies of the pixel size $\delta$ in the mapped image $R_C$, i.e., the mesh grid resolution:

$$\rho_\omega = k \cdot \text{sign}(b) \cdot \delta, \omega=0, \ldots, \Omega-1$$

Dividing the Z-range of the TOF camera into $\Omega$ intervals $[\zeta_{\omega+1}, \zeta_\omega]$ around $Z_\omega$, with $$\zeta_\omega = f \cdot \frac{|b|}{\left(\omega - \frac{1}{2}\right)\delta}, \omega = 1, \ldots, \Omega$$

$$\zeta_0 = \infty$$

one finds that each pixel of the range camera with a Z-value in the interval $[\zeta_{\omega+1}, \zeta_\omega]$, the disparity ρ calculated according to formula (1) equals $\rho_\omega$ up to an error less than δ/2, i.e. half the pixel size in the high resolution 3-D image $R_C$. The maximum binocular disparity $|\rho_{\Omega-1}|=(\Omega-1)\delta$ that has to be considered is given by $Z_{min}$, the minimum Z-measurement range of the range sensor, via the inequality:

$$\Omega \geq f \cdot \frac{|b|}{Z_{min}\delta} + \frac{1}{2}$$

The mapping from the source range image to the target, rectified and up-sampled range image $R_C$, is performed according to the following algorithm:

```
for i = 1 to Ξ do
    for j = 1 to Ψ do
        ω = Ω
        while (ω > 0) and (Z_B (L_BC (i, j)) > ζ_ω) do
            ω = ω − 1
        end while
        R_C (i, j) = R'_B (L_BC,ω (i, j))
    end for
end for
```

The loop variable ω is associated with surface distances $Z_\omega$ and thresholds $\zeta_\omega$ as defined hereinbefore. The while loop performs the following for each w, until the loop is stopped:

a) By evaluating $L_{BC,\omega}(i,j)$, it is determined which one of the source pixels $\{(k,l), k=1 \ldots K, l=1 \ldots L\}$ of the grid of source pixels would "look at" the same point in the scene (would have the same point in the scene projected thereon in accordance with the projection that links the source image to the scene) as target pixel (i,j) would "look at" (would have projected thereon in accordance with the projection that links the target image to the scene) if the imaged scene were a planar surface at distance $Z_\omega$ from the projection center of the 3D camera reference frame B.
b) By evaluating $Z_B(L_{BC,\omega}(i,j))$, one determines the depth coordinate of the point in the scene that the source pixel determined in step a) actually looks at.
c) The iteration is continued until the loop variable ω reaches 1 or $Z_B(L_{BC,\omega}(i,j)) \leq \zeta_\omega$. If the latter condition is fulfilled, the surface distance $Z_\omega$ equals at least approximately the depth coordinate of the point in the scene that the source pixel determined in step a) actually looks at. With the above choice of the thresholds $\zeta_\omega$ the tolerance is such that the error in the resulting disparity is less than half the pixel size in the target image. This means that even if the surface distances $Z_\omega$ were chosen closer together, one would not obtain a better matching of the pixels.

Figure 10:
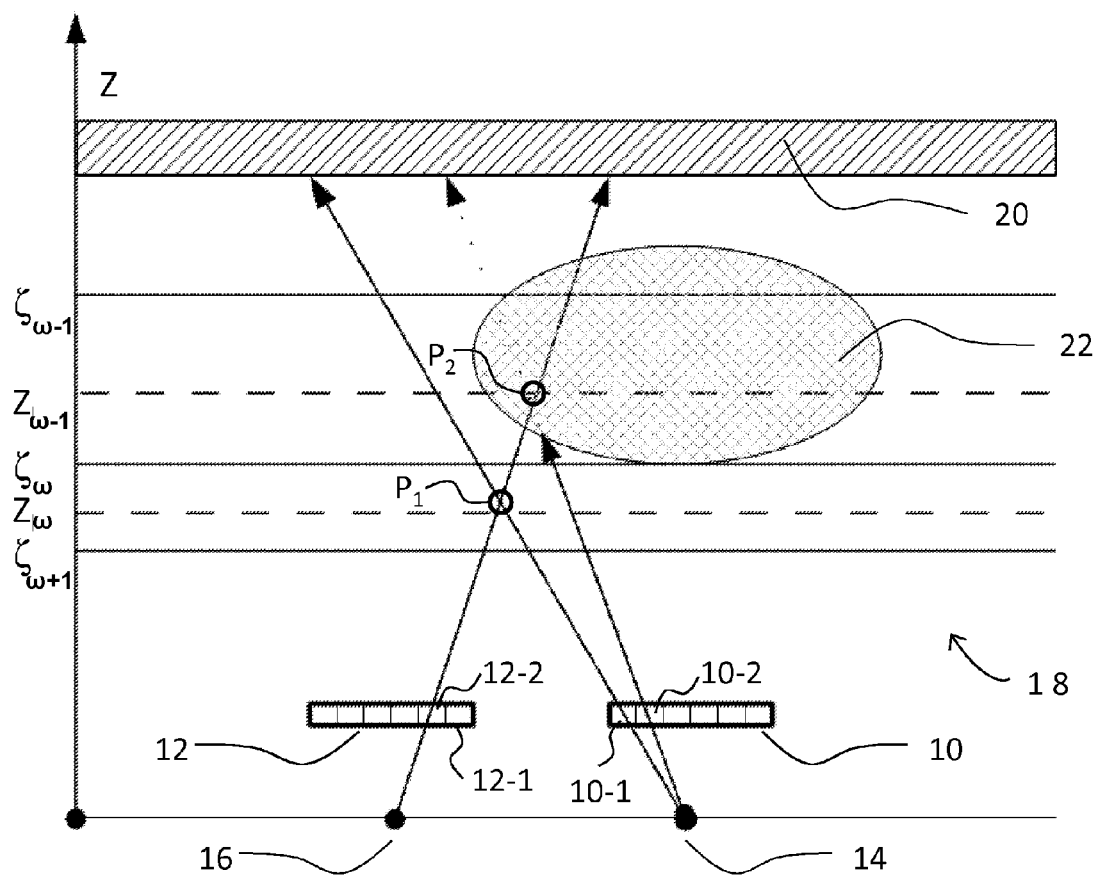
FIG. 10 is a schematic illustration of the mapping of 3D image pixels onto a target grid seeing the scene from another prespective.

FIG. 10 is an illustration of steps a)-c) on the example of rectified 2D and 3D images. The 3D image is represented as a grid 10 of source pixels 10-1, 10-2, etc. Steps a)-c) establish the correspondence between the grid 10 of source pixels and the grid 12 of target pixels 12-1, 12-2, etc. The projection centers (points of sight) of the source image and the target image are shown at reference numbers 14 and 16, respectively. The algorithm is explained with respect to target pixel 12-2. In step a), $L_{BC,\omega}$(target pixel 12-2) yields source pixel 10-1 because these pixels would look at the same point $P_1$ if the imaged scene 18 consisted of a wall at the distance $Z_\omega$ from point of sight 14. However, pixel 10-1 actually looks at the scene background 20. Accordingly, the depth coordinate $Z_B$(pixel 10-1) is much greater than threshold $\zeta_\omega$. This means that at point $P_1$, the scene 18 is deeper than and that source pixel 10-1 thus does not correspond to target pixel 12-2 for that particular scene 18. Accordingly, steps a)-c) have to be repeated for ω−1. For ω−1, $L_{BC,\omega-1}$(target pixel 12-2) yields source pixel 10-2 because these pixels would look at the same point $P_2$ if the imaged scene 18 consisted of a wall at the distance $Z_{\omega-1}$ from point of sight 14. Because pixel 10-2 actually looks at scene object 22, it is found that $Z_B$(pixel 10-2)=$Z_B(L_{BC,\omega-1}$(target pixel 12-2))<$\zeta_{\omega-1}$ and the iteration stops. This establishes the correspondence of pixel 12-2 of the target grid and pixel 10-2 of the source grid. What remains to be done is calculating (or looking up) the distance $R'_B$(pixel 10-2) from the second point of sight 16 to the point on the object 22 that pixel 10-2 looks at.

The distance value that is thus obtained is associated with pixel 12-2.

It is worthwhile noting that the distance image $\{R_B(k,l)\}$ may be converted into the distance image $\{R'_B(k,l)\}$ before the iteration of steps a)-c) starts. This is due to the fact that the positions of the points of sight relative to one another is known. Each distance value $R_B(k,l)$ represents the distance from the first point of sight to the point in the scene that source pixel (k,l) looks at (in accordance with the first projection). This allows computing the position vector $\underline{P}(k,l)$ of the point in the scene, e.g. as $\underline{P}(k,l)=(X_B(k,l), Y_B(k,l), Z_B(k,l))$ using formula (2) and correcting the distortion, if necessary). Given the position $\underline{P}_{O2}$ of the second point of sight relative to the first point of sight, one can calculate $R'_B(k,l)$ as the modulus of $\underline{P}(k,l)-\underline{P}_{O2}$ (i.e. $R'_B(k,l)=\|\underline{P}(k,l)-\underline{P}_{O2}\|$). If, for all points in the scene $R_B(k,l)=\|\underline{P}(k,l)\|>>\|\underline{P}_{O2}\|=|b|$, which may well be the case in many practical applications, one may neglect the correction of the distance values and use $R'_B(k,l)=R_B(k,l)$ in step c).

The fact that the while loop over the discrete disparities labeled by w is performed in descendent order accounts for shadowing effects. If two object points in the scene that are mapped on different pixels in the source image were to be mapped on the same target pixel, the 3D point with the smaller distance (and thus the larger disparity) is retained in the mapping. Indeed, it is this point that shadows the other but not vice versa.

Memory Optimized Realization of the Data Matching

The algorithm can be performed in real-time by an appropriate calculation unit as they are used in machine vision applications.

Its only drawback is that a number Ω of look-up-tables have to be stored that occupy memory space.

Figure 9:
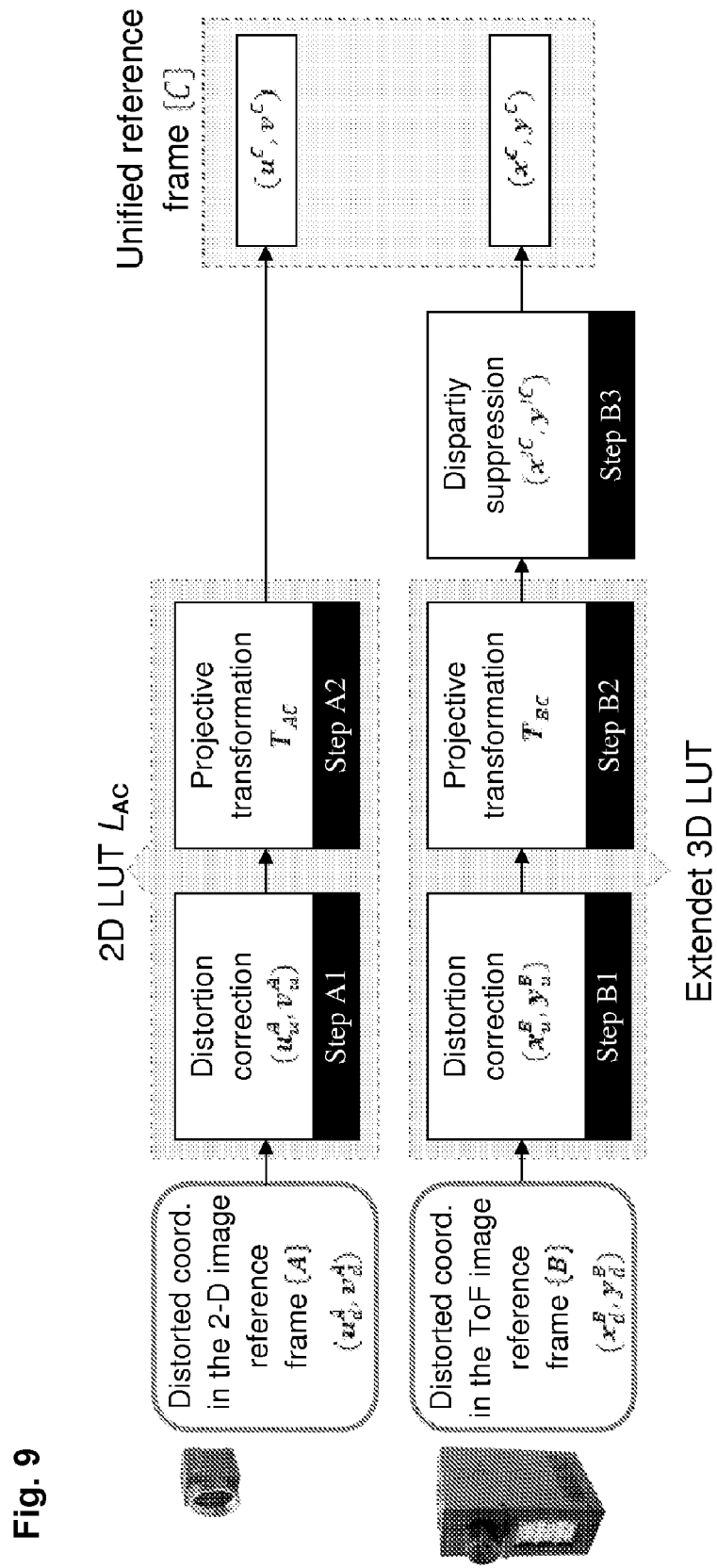
FIG. 9 is a flowchart of sequence of transformations of the pixel coordinates of a 3D imager and a 2D camera to a common reference frame that is an alternative to the sequence of FIG. 4

This can be drastically reduced if the projective transformation in step B3 that maps the pixel coordinates of the 3D sensor from the 3D reference system is close to a pure translation i.e. does not contain any scaling or rotation. This situation is typically the case for a system of two cameras, which are well aligned in parallel and have a well-known focal length. Should this not be the case, such geometry can be achieved by applying a projective transformation before calculating the binocular disparity shift, i.e. by exchanging steps B2 and B3 in the sequence of coordinate transformations of the 3D camera (see FIG. 9). As described in step 1.ii. for a stereo vision system, the projective transformations $T_{AC}$ and $T_{BC}$ map the coordinates of the two camera systems to two co-planar image planes with x-axes parallel to the line connecting the projection centers of the two cameras. This implementation of the chain of transformation thus has less flexibility in choosing the common reference frame than the first implementation shown in FIG. 4. Moreover, the calibration process for determining the transformations maybe more intricate.

As the projective transformation of the 3D image does not affect the projection center, the radial distances $R_B(k,l)$ stay invariant under this transformation. The Z-coordinates have, however, to be re-calculated according to formula (2) from the radial distances and the transformed coordinates ($x^C(k,l)$, $y^C(k,l)$). This may, however, be accomplished by using some pre-computed unit vectors as in the calculation of $Z_B(k,l)$ (see [4]).

Due to this coordinate choice, the disparity is in the x-direction and can be calculated from the transformed z-coordinates $Z'_C(k,l)$ using formula (3). The coordinates ($x^C(k,l)$, $y^C(k,l)$) calculated for two different $Z_C$-values $Z_\omega$ and $Z_{\omega+1}$ (see equation (3)) differ by exactly one pixel size 8 in x-direction, where the sign of the difference depends on the sign of the displacement b of the 3D camera to the 2D camera (with respect to the x-axis). Since there is no further scaling or rotation applied to the coordinates ($x^C(k,l)$, $y^C(k,l)$), the corresponding look-up-tables $L_{BC,\omega+1}$ and $L_{BC,\omega}$ are related via $$L_{BC,\omega+1}(i,j)=L_{BC,\omega}(i,j-s)$$

with s=sign(b) and where i and j indexes the pixels in Y and X directions, respectively.

Consequently, it is sufficient to store a single look-up table, hereinafter denoted $L_{BC,0}$, calculated on an extended mesh grid of size M×(N+K−1) which defines all Ω look-up-tables via $$L_{BC,\omega}(i,j)=L_{BC,0}(i,j-s\omega)$$

with i=1, ..., M, j=1, ..., N, and ω=0, ..., Ω−1.

The above algorithm becomes then

```
for i = 1 to Ξ do
    for j = 1 to Ψ do
        ω = Ω
        while (ω > 0) and Z_C (L_{BC,0} (i, j − sω)) > ζ_ω do
            ω = ω − S
        end while
        Z_C (i, j) = Z'_C (L_{BC,0} (i, j − sω))
    end for
end for.
```

It is worthwhile noting that this algorithm does not map the radial distance image $R_B$ directly to the new range image $R_C$, but instead the image $Z'_C$ of Z-values to a new image $Z_C$, because the Z-values are invariant under the disparity shift in X-direction (The difference between the two images $Z'_C$ and $Z_C$ are not the Z-values themselves, but the assignment of the values to pixel positions). The radial distance image can be directly obtained from $Z_C$ by multiplying the values with a pre-calculated factor given by the pixel coordinates of the common grid (see formula (2)).

References

[1] R. Crabb C. Tracey, A. Puranik, and J. Davis, Real-time Foreground Segmentation via Range and Color Imaging, Proceedings of the First International Workshop on Internet Vision (in conjunction with CVPR), Anchorage, Ak., 2008

[2] D. Chan, H. Buisman, C. Theobalt, and S. Thrun, A noise-aware filter for real-time depth upsampling, Workshop on Multi-camera and Multi-modal Sensor Fusion Algorithms and Applications, ECCV, 2008.

[3] F. Garcia, B. Mirbach, B. Ottersten, F. Grandidier, and A. Cuesta., Pixel weighted average strategy for depth sensor data fusion, Proceedings of the International Conference of Computer Vision (ICIP 2010)

[4] B. Mirbach, M. Castillo-Franco, and R. Ginhoux, Method For Determining The Position Of An Object From A Digital Image; WO 2006/058872

[5] E. Trucco and A. Verri, Introductory Techniques for 3-D Computer Vision, Prentice Hall PTR, Upper Saddle River, N.J., USA, 1998, chapter 7

[6] R. Hartley and A. Zisserman, Multiple View Geometry in Computer Vision, Cambridge University Press, second edition, 2003

Legend:
10 Grid of source pixels
10-1, 10-2 Source pixels
12 Grid of target pixels
12-1, 12-2 Target pixels
14 First point of sight (first projection center)
16 Second point of sight (second projection center)
18 Scene
20 Scene background
22 Scene object
$P_1$, $P_2$ Points in the scene

The invention claimed is:

1. A method for matching source pixels of a first range image of a scene as seen from a first point of sight with target pixels of a second range image of said scene as seen from a second point of sight; said method comprising: providing said first range image as a grid of source pixels, on which said scene is mapped in accordance with a first projection associated with said first point of sight, wherein each source pixel has a point in said scene projected thereon in accordance with said first projection and has an associated range value that has been determined for that point in the scene; providing a grid of target pixels for said second range image and a second projection associated with said second point of sight; and for each one of said target pixels, a) determining which source pixel would have a same point in said scene projected thereon in accordance with said first projection as said target pixel in accordance with said second projection if the imaged scene were a planar surface at a surface distance from said first point of sight; b) determining a depth coordinate of a point in said scene that said source pixel determined in step a) actually has projected thereon in accordance with said first projection; c) if said depth coordinate is greater than a threshold, which is itself greater than said surface distance, repeating steps a), b) and c) with an increased surface distance at step a) and an increased threshold at step c), and else associating said target pixel with the source pixel determined in step a).

2. The method as claimed in claim 1, wherein associating said target pixel with the source pixel determined in step a) comprises or consists of determining and associating with said target pixel the distance from said second point of sight to the point in said scene which said source pixel determined in step a) actually has projected thereon in accordance with said first projection.

3. The method as claimed in claim 1, wherein associating said target pixel with the source pixel determined in step a) comprises or consists of associating said depth coordinate with said target pixel.

4. The method as claimed in claim 1, wherein iteration of steps a), b) and c) is carried out with a predefined series of surface distances and a predefined series of thresholds.

5. The method as claimed in claim 4, wherein said series of surface distances corresponds to an arithmetic sequence of binocular disparity values, a common difference of said arithmetic sequence being equal or substantially equal to a mesh size of said grid of target pixels.

6. The method as claimed in claim 1, wherein step a) is carried out using a lookup table associated with said surface distance.

7. The method as claimed as claimed in claim 1, wherein said first range image is distortion-corrected.

8. The method as claimed in claim 1, wherein said second range image has a higher resolution than said first range image.

9. The method as claimed in claim 1, wherein said grid of source pixels and said grid of target pixels are located in a common image plane.

10. The method as claimed in claim 9, wherein said grid of source pixels and said grid of target pixels are regular rectangular grids.

11. The method as claimed in claim 10, wherein said grid of source pixels has two grid axes, wherein said grid of target pixels also has two grid axes, and wherein one of said grid axes of said grid of source pixels and one of said grid axes of said grid of target pixels are parallel to a line passing through said first and second points of sight.

12. The method as claimed in claim 11, wherein iteration of steps a), b) and c) is carried out with a predefined series of surface distances and a predefined series of thresholds, wherein said series of surface distances corresponds to an arithmetic sequence of binocular disparity values, a common difference of said arithmetic sequence being equal or substantially equal to a mesh size of said grid of target pixels, and wherein step a) is carried out using a single lookup table associated with said series of surface distances.

13. The method as claimed in claim 1, comprising providing a two-dimensional image of said scene as seen from said second point of sight; wherein said two-dimensional image is mapped on said grid of target pixels via at least one of a distortion correction and/or a projective transformation.

14. A non-transitory Computer program product, including nonvolatile memory comprising instructions for causing a processor to carry out, when said instructions are executed by said processor, a method for matching source pixels of a first range image of a scene as seen from a first point of sight with target pixels of a second range image of said scene as seen from a second point of sight; said method comprising: providing said first range image as a grid of source pixels, on which said scene is mapped in accordance with a first projection associated with said first point of sight, wherein each source pixel has a point in said scene projected thereon in accordance with said first projection and has an associated rangy e value that has been determined for that point in the scene; providing a grid of target pixels for said second range image and a second projection associated with said second point of sight; and for each one of said target pixels, a) determining which source pixel would have a same point in said scene projected thereon in accordance with said first projection as said target pixel in accordance with said second projection if the imaged scene were a planar surface at a surface distance from said first point of sight; b) determining a depth coordinate of a point in said scene that said source pixel determined in step a) actually has projected thereon in accordance with said first projection; c) if said depth coordinate is greater than a threshold, which is itself greater than said surface distance, repeating steps a), b) and c) with an increased surface distance at step a) and an increased threshold at step c), and else associating said target pixel with the source pixel determined in step a).

* * * * *